(12) United States Patent
Tanaka

(10) Patent No.: US 8,514,456 B2
(45) Date of Patent: Aug. 20, 2013

(54) IMAGE FORMING APPARATUS AND IMAGE READER THAT CAN EXECUTE COPY CONTROL BY USING ONE OPERATION RESTRICTING DOT PATTERN

(75) Inventor: Kunihiko Tanaka, Osaka (JP)

(73) Assignee: Kyocera Mita Corporation (JP)

( * ) Notice: Subject to any disclaimer, the term of this patent is extended or adjusted under 35 U.S.C. 154(b) by 619 days.

(21) Appl. No.: 12/692,994

(22) Filed: Jan. 25, 2010

(65) Prior Publication Data

US 2010/0188675 A1   Jul. 29, 2010

(30) Foreign Application Priority Data

Jan. 29, 2009   (JP) ................................. 2009-017941

(51) Int. Cl.
*G06K 15/00* (2006.01)
(52) U.S. Cl.
USPC .......................... 358/3.28; 382/100; 358/1.14
(58) Field of Classification Search
None
See application file for complete search history.

(56) References Cited

U.S. PATENT DOCUMENTS

| | | | |
|---|---|---|---|
| 2003/0179399 A1 | 9/2003 | Matsunoshita | |
| 2005/0078331 A1 | 4/2005 | Guan et al. | |
| 2006/0256362 A1* | 11/2006 | Guan et al. | 358/1.14 |
| 2009/0097698 A1* | 4/2009 | Kasahara | 382/100 |
| 2010/0142003 A1* | 6/2010 | Braun et al. | 358/3.28 |

FOREIGN PATENT DOCUMENTS

JP   2004-274092   9/2004

* cited by examiner

*Primary Examiner* — Barbara Reinier
(74) *Attorney, Agent, or Firm* — Gerald E. Hespos; Michael J. Porco; Matthew T. Hespos

(57) ABSTRACT

An image forming apparatus has R, G and B dot pattern detection units that detect the presence/absence of image data of operation restricting dot patterns of R, G and B color components respectively in document image data. A dot pattern color determination unit determines the presence/absence of the operation restricting dot pattern and the color of the operation restricting dot pattern on a document from the detection results from the detection units. A restriction detail table storage unit stores, beforehand, a table showing the correspondence relationship between the color of the operation restricting dot pattern and a restriction detail concerning a copy operation. An image formation control unit determines, based on a determination of the dot pattern color determination unit and the table, whether a current setting of a multi-functional peripheral is relevant to the restriction detail corresponding to the color, and, when relevant, prohibits the copy operation.

6 Claims, 8 Drawing Sheets

| DOT PATTERN DETECTION RESULT | | | | COLOR OF PATTERN |
|---|---|---|---|---|
| R | G | B | | |
| ○ | ○ | ○ | → | BLACK |
| × | ○ | ○ | → | RED |
| ○ | × | ○ | → | GREEN |
| ○ | ○ | × | → | BLUE |
| ○ | × | × | → | CYAN |
| × | ○ | × | → | MAGENTA |
| × | × | ○ | → | YELLOW |
| × | × | × | → | NO PATTERN |

○: DETECTED
×: UNABLE TO DETECT

| COLOR OF OPERATION RESTRICTING DOT PATTERN | CONTROL DETAIL |
|---|---|
| BLACK | PROHIBIT ALL OUTPUTS |
| RED | PROHIBIT COPYING (COLOR/BLACK-AND-WHITE) |
| GREEN | PROHIBIT COPYING (COLOR ONLY) |
| BLUE | PROHIBIT COPYING AND SCANNING |
| CYAN | PROHIBIT OUTPUTTING BEFORE SPECIFIC DATE |
| MAGENTA | PROHIBIT OUTPUTTING PERFORMED BY PERSON OTHER THAN MANAGER |

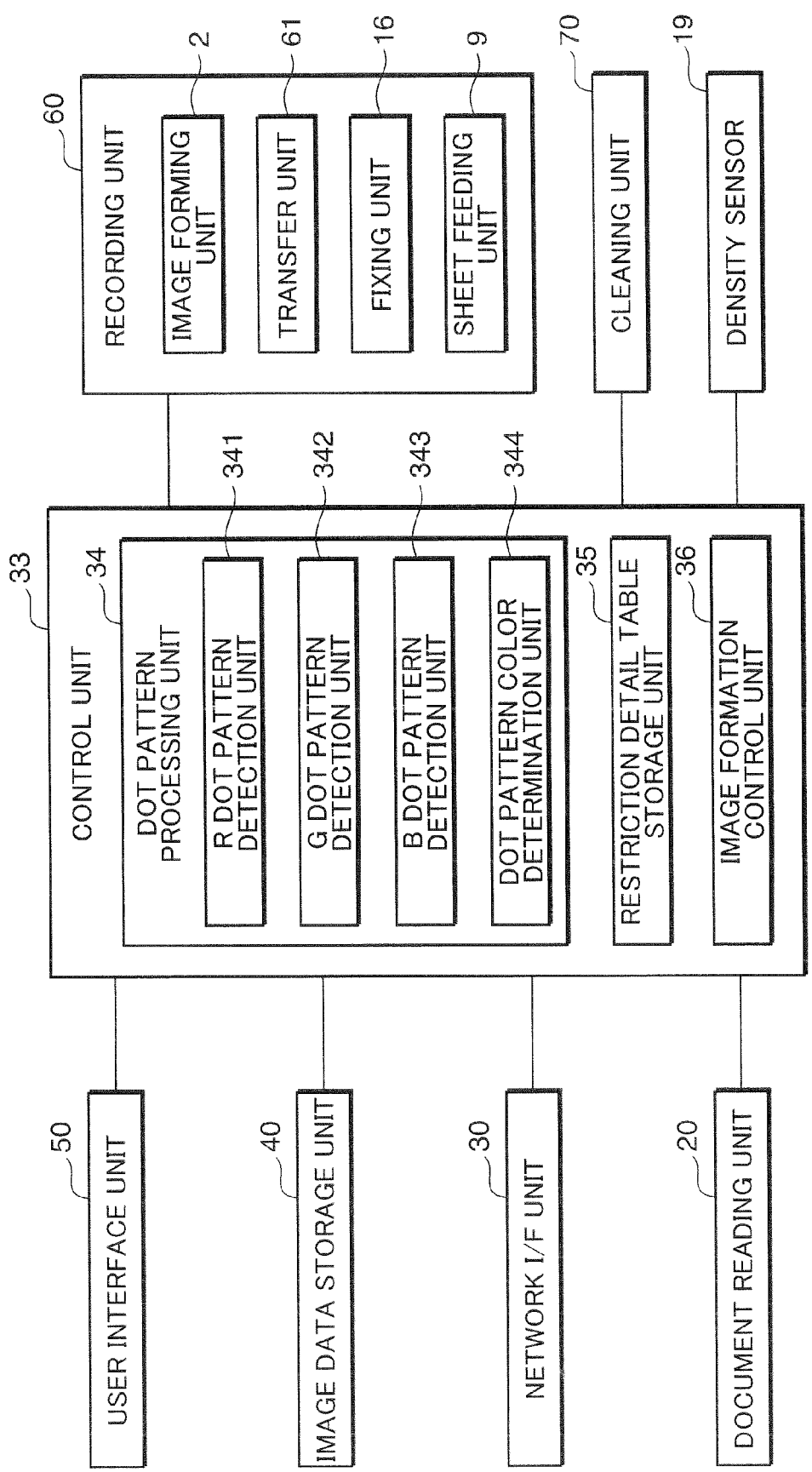

FIG.4A    FIG.4B
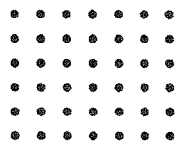
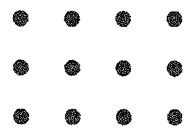
FIG.5
| COLOR OF OPERATION RESTRICTING DOT PATTERN | R | G | B |
|---|---|---|---|
| BLACK | SMALL | SMALL | SMALL |
| RED | LARGE | SMALL | SMALL |
| GREEN | SMALL | LARGE | SMALL |
| BLUE | SMALL | SMALL | LARGE |
| CYAN | SMALL | LARGE | LARGE |
| MAGENTA | LARGE | SMALL | LARGE |
| YELLOW | LARGE | LARGE | SMALL |

FIG.6

| DOT PATTERN DETECTION RESULT | | | | COLOR OF PATTERN |
|---|---|---|---|---|
| R | G | B | | |
| ○ | ○ | ○ | → | BLACK |
| × | ○ | ○ | → | RED |
| ○ | × | ○ | → | GREEN |
| ○ | ○ | × | → | BLUE |
| ○ | × | × | → | CYAN |
| × | ○ | × | → | MAGENTA |
| × | × | ○ | → | YELLOW |
| × | × | × | → | NO PATTERN |

○: DETECTED
×: UNABLE TO DETECT

FIG.7

| COLOR OF OPERATION RESTRICTING DOT PATTERN | CONTROL DETAIL |
|---|---|
| BLACK | PROHIBIT ALL OUTPUTS |
| RED | PROHIBIT COPYING (COLOR/BLACK-AND-WHITE) |
| GREEN | PROHIBIT COPYING (COLOR ONLY) |
| BLUE | PROHIBIT COPYING AND SCANNING |
| CYAN | PROHIBIT OUTPUTTING BEFORE SPECIFIC DATE |
| MAGENTA | PROHIBIT OUTPUTTING PERFORMED BY PERSON OTHER THAN MANAGER |

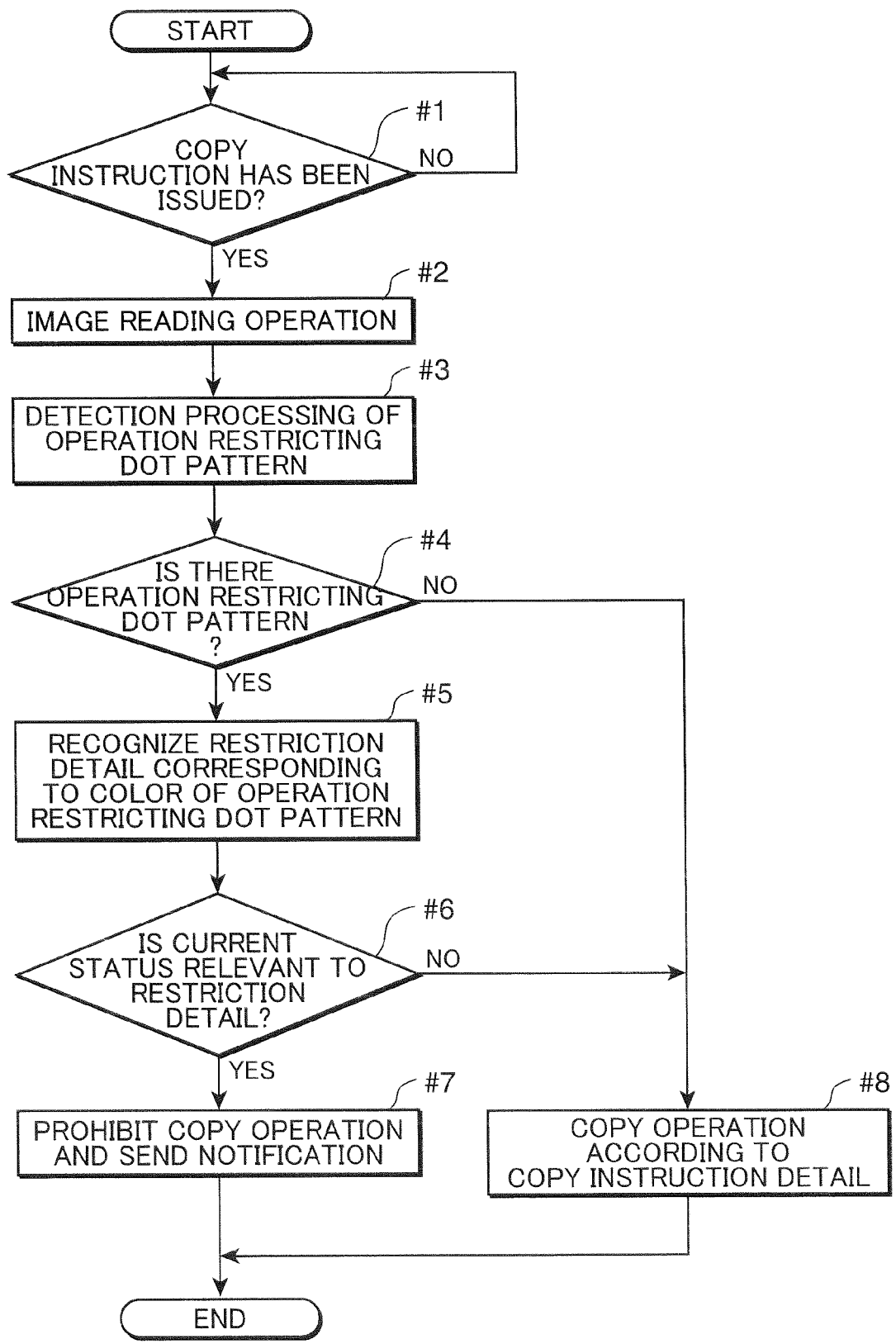

IMAGE FORMING APPARATUS AND IMAGE READER THAT CAN EXECUTE COPY CONTROL BY USING ONE OPERATION RESTRICTING DOT PATTERN

BACKGROUND OF THE INVENTION

1. Field of the Invention

The present invention relates to an image forming apparatus and an image reader, such as a copy machine and a multifunctional peripheral, and particularly to operation control performed based on a pattern for prohibiting the copying or reading of a document when the pattern is detected.

2. Description of the Related Art

There have conventionally been various technologies for preventing or inhibiting the copying or duplication of a confidential document that needs to be kept confidential, such as data containing classified information of a company, and for preventing or inhibiting the use of a copied material thereof. One of the technologies is a tint block print technology for embedding, in the image of a document, a tint block that has the background composed of a certain number of screen lines and a latent image part composed of screen lines the number of which is higher than that of the abovementioned screen lines (halftone dot density).

For example, according to a known technology of this kind, if a document image created by this tint block print technology is copied, area corresponding to the latent image embedded in the document image becomes white in the copy, so that patterns such as "copy prohibited" emerges visibly. With this technology, copying of a document can be psychologically restricted or inhibited.

However, this conventional technology merely restricts or inhibits the copying of a document psychologically, and is not capable of stopping a foul conduct of copying itself.

For the purpose of restricting such a foul conduct, there is proposed a technology for reading the image of a document, detecting a special dot pattern embedded in a background image that is contained in image data obtained by the reading operation, comparing the detected special dot pattern with a special dot pattern stored in advance, and prohibiting an action of forming the image on a piece of paper when the both special dot patterns match.

However, according to this conventional technology, the control for prohibiting the action of forming the image on a piece of paper and control for allowing the action are switched only in accordance with whether or not a predetermined special dot pattern exists or not. Therefore, it cannot perform advanced control such as a control of allowing a predetermined user to obtain a copy even if the special dot pattern is determined, a control of allowing use of limited function such as allowing only black-and-white copying out of color copying or black-and-white copying, or a control of allowing only low-resolution scanning out of high-resolution scanning or low-resolution scanning.

Furthermore, an image forming apparatus performing the following control is proposed. Specifically, the image forming apparatus carries out a series of control described below. That is, (1) in order to improve a fixed form that cannot allow an advance control operation to be performed, such as allowing a specific user to perform copying depending on the document or allowing copying to be performed after a predetermined date, this image forming apparatus (2) stores duplication prohibiting information, which indicates that a document instructed to be printed out is prevented from being duplicated by a copy machine (prohibiting the duplication), and condition information (including a password, a user ID number (staff number etc.) allowing the duplication, a date when the prohibition of the duplication is lifted, and a machine number of the copy machine allowing the duplication), which indicates a condition for enabling duplication of the document instructed to be printed out, (3) has a pattern image storage unit for storing a pattern image shown by a plurality of types of dot patterns corresponding to code data obtained by encoding the duplication prohibition information or the condition information, and (4) when a document image read by an image reader contains a pattern image showing a duplication-prohibited code during a "normal copy mode," a duplication prohibition information detection unit detects that the pattern image is contained, thereby prohibiting a duplication operation. On the other hand, when the pattern image showing the duplication-prohibited code is not contained, the duplication prohibition information detection unit enables a normal duplication operation for printing out the read image onto a piece of paper. (5) When the document image read by the image reader contains a pattern image showing a condition code during a "conditional copy mode," a condition information detection unit detects that the pattern image is contained, and allows the duplication operation to be performed only when the condition matches a predetermined condition that is registered in advance. When, on the other hand, the pattern image showing the condition code is not contained, the condition information detection unit enables the normal duplication operation for printing out the read image onto a piece of paper.

SUMMARY OF THE INVENTION

The present invention was devised by improving the conventional technologies described above.

In other words, the present invention is an image forming apparatus having: an image reading unit that reads an image of a document; a recording unit that forms an image on a recording medium based on image data obtained by a reading operation of the image reading unit; a detection unit that detects a predetermined operation restricting dot pattern formed on the document based on the image data obtained by the reading operation of the image reading unit, and detects a color of the operation restricting dot pattern when the operation restricting dot pattern is detected; a storage unit that stores, beforehand, a correspondence relationship between the color of the operation restricting dot pattern and a restriction detail for an operation of the image forming apparatus; and a control unit that reads, from the storage unit, the restriction detail corresponding to the color of the operation restricting dot pattern when the operation restricting dot pattern and the color thereof are detected by the detection unit, and then restricts the operation of the image forming apparatus in accordance with the restriction detail.

BRIEF DESCRIPTION OF THE DRAWINGS

FIG. 2 is a block diagram showing an electrical configuration of the multi functional peripheral;

FIG. 4A and FIG. 4B are diagram showing dot patterns that form a latent image part and a background to form the tint block;

FIG. 5 is a diagram showing the relationship between a color of an operation restricting dot pattern formed on a document and the presence/absence of image data of each of color components of R (red), G (green) and B (blue) that are obtained by reading the operation restricting dot pattern according to these colors;

FIG. 6 is a diagram of a table showing the relationship between the presence/absence of the operation restricting dot pattern of each color component and the color of the operation restricting dot pattern;

FIG. 7 is a diagram showing an example of a restriction detail table that shows the correspondence relationship between the color of the operation restricting dot pattern and the restriction detail related to a copy operation;

FIG. 8 is a flowchart showing a series of copy operations performed by the multi functional peripheral;

DETAILED DESCRIPTION OF THE PREFERRED EMBODIMENTS

Figure 1:
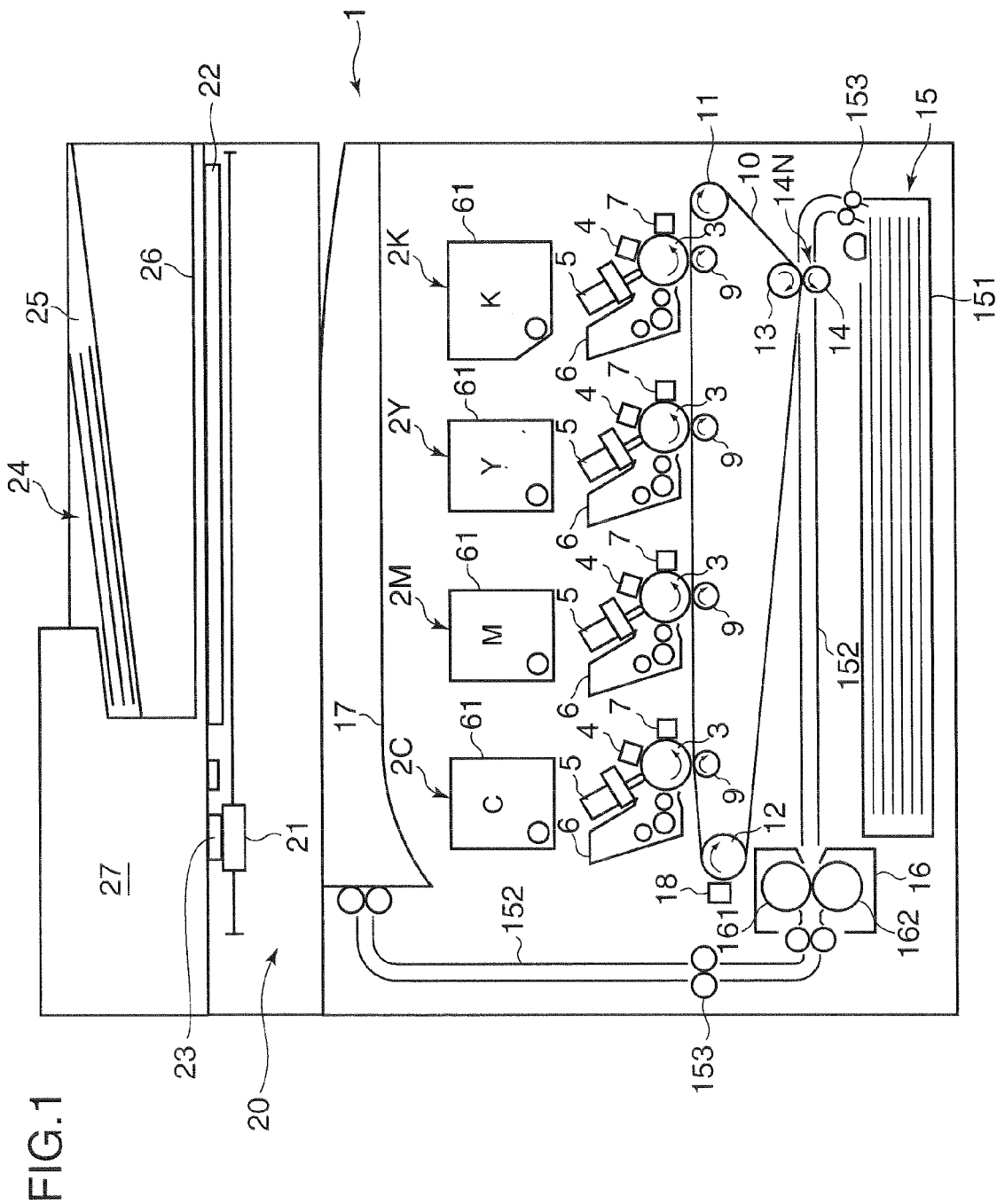
FIG. 1 is a schematic configuration diagram of a multi functional peripheral according to an embodiment of the present invention.

A multi functional peripheral as an example of an image forming apparatus according to the present invention is described hereinafter with reference to the drawings. FIG. 1 is a schematic configuration diagram of a multi functional peripheral according to an embodiment of the present invention.

As shown in FIG. 1, image forming units 2C, 2M, 2Y, 2K (collectively referred to as "image forming unit 2") with colors of C (cyan), M (magenta), Y (yellow) and K (black) respectively are arranged in a main body of a multi functional peripheral 1.

The image forming unit 2 forms (prints) a color image on a sheet of paper, wherein each of the image forming units 2C, 2M, 2Y and 2K has a photoreceptor drum 3 that has a photosensitive layer composed of, for example, a amorphous silicon, and a charging unit 4, exposure unit 5, developing unit 6 and photoreceptor cleaning unit 7 that are disposed around the photoreceptor drum 3.

The charger 4 charges the entire surface of the photoreceptor drum 3 evenly to a predetermined potential. The exposure unit 5 radiates, on to the surface of the photoreceptor drum 3, a laser beam generated based on image data transmitted from an image data storage unit 40 (see FIG. 2) that will be described hereinafter, and then forms an electrostatic latent image on the surface of the photoreceptor drum 3.

The developing unit 6 applies a toner (an example of a developer), which is supplied from a toner supply unit 61, to an exposure part of the electrostatic latent image formed on the photoreceptor drum 3, and thereby makes the electrostatic latent image visible as a toner image. The photoreceptor cleaning unit 7 removes the toner that remains on the surface of the photoreceptor drum 3 without being transferred to the intermediate belt 10 after the toner is primarily-transferred to an intermediate belt 10, which will be described hereinafter.

Intermediate transfer rollers 9 (primary transfer rollers) and the intermediate belt (intermediate transfer belt) 10 for carrying out intermediate transfer (primary transfer) of the toner image formed on the surface of the photoreceptor drums 3 are disposed below the image forming units 2M to 2K. The intermediate belt 10 is in the form of a predetermined belt and is wound around a driving roller 11, a driven roller 12 and a tension roller 13. The intermediate belt 10 is configured to be rotated by the driving roller 11 endlessly while being pressed against each photoreceptor drum 3 by the intermediate transfer roller 9 facing the photoreceptor drum 3. The driven roller 12 and the tension roller 13 are rotate in accordance with the rotation of the intermediate belt 10. The tension roller 13 also provides an appropriate tension to the intermediate belt 10.

The toner images of respective colors that are formed on the photoreceptor drums 3 are primarily transferred and superimposed onto the endlessly rotating intermediate belt 10 by the action of the intermediate transfer rollers 9 in order of cyan, magenta, yellow and black in synchronized timing. As a result, a color image configured by the four colors of C, M, Y and K is formed on the intermediate belt 10.

A secondary transfer roller 14 is provided in a position facing the tension roller 13 with the intermediate belt 10 therebetween. The secondary transfer roller 14 is brought into pressure-contact with the tension roller 13 to have the intermediate belt 10 therebetween. The secondary transfer roller 14 transfer the color image on the intermediate belt 10 to the sheet of paper by means of a secondary bias applied to the secondary transfer roller 14 by the control of a control unit 33 (see FIG. 2), which will be described hereinafter.

The multi functional peripheral 1 further has a sheet feeding unit 15 that feeds the sheet of paper toward a secondary transfer nip 14N formed between the tension roller 13 and the secondary transfer roller 14. The sheet feeding unit 15 has a sheet feeding cassette 151 storing sheets of paper, a conveying path 152 that is a path on which the sheets of paper are conveyed, and conveying roller pairs 153 that conveys the sheets of paper conveyed in the conveying path 152 and so on. The sheets of paper are conveyed one by one from the sheet feeding cassette 151 to the secondary transfer nip 14N. Note that the sheet feeding unit 15 conveys the sheet of paper subjected to the secondary transfer process, to a fixing unit 16, and then discharges this sheet of paper subjected to a fixing process, to a sheet discharge tray 17 disposed in an upper part of the main body of the multi functional peripheral.

The fixing unit 16 is provided in an appropriate section on a further downstream side than the secondary transfer nip 14N in the conveying path 152. The fixing unit 16 is for fixing the toner image transferred to the sheet of paper. The fixing unit 16 is configured by a heating roller 161 and a pressure roller 162, wherein the heat of the heating roller 161 melts the toners on the sheet of paper, and the pressure of the pressure roller 162 fixes the toners onto the sheet of paper.

Furthermore, the multi functional peripheral 1 has a neutralizing cleaner 18. The neutralizing cleaner 18 is for removing (restoring) the toner that remains on the intermediate belt 10 without being transferred to the sheet of paper (residual toner). The neutralizing cleaner 18 is configured by a cleaning electrode and cleaning brush (rotating brush) that are not shown. The cleaning electrode applies a cleaning bias having an opposite polarity to that of an electrification charge of the toner, to the cleaning brush, and thus obtained electrostatic force moves the toner on the intermediate belt 10 to the cleaning brush, whereby toner removal for removing the toner from the intermediate belt 10 is carried out.

A document reader 20 and document feeding unit 24 are provided in the upper part of the main body of the multi functional peripheral 1. The document reader 20 has a CCD (Charge Coupled Device) sensor and a scanner unit 21 configured by an exposure lamp, a document board 22 and a document reading slit 23 made from glass or other transparent member.

The CCD has, for example, three rows of photoelectric conversion elements arranged in a sub-scanning direction, each row having a plurality of photoelectric conversion elements arranged in a main scanning direction, wherein one of the rows has an R (red) filter disposed therein, another one has a G (green) filter, and the other one has a B (blue) filter. Each row configures a line sensor. Note that in the following description, the three photoelectric conversion elements arranged that have the R (red), G (green) and B (blue) filters disposed therein and are arranged in the sub-scanning direction are considered as one pixel. Here, the image data of each of the color components of R (red), G (green) and B (blue) is output from one pixel by the CCD. Note that the color system represented by each of the color components of R (red), G (green) and B (blue) is an example of a predetermined color system described in the patent claims.

The scanner unit 21 is configured to be moved by a drive unit, which is not shown. When reading the document placed on the document board 22, the scanner unit 21 is moved along the document surface at a position facing the document board 22, and outputs the acquired image data to the control unit 33 (see FIG. 2) while scanning the document image. When reading the document fed by the document feeding unit 24, the scanner unit 21 is moved to a position facing the document reading slit 23 to acquire, through the document reading slit 23, the document image in synchronization with a document conveying operation performed by the document feeding unit 24, and outputs the image data to the control unit 33.

The document feeding unit 24 has a document placing unit 25 for placing the document thereon, a document discharge unit 26 for discharging the document whose image has been read, and a document conveying mechanism 27 that conveys documents placed on the document placing unit 25, one by one, to a position facing the document reading slit 23, and is configured by a sheet feeding roller and conveying roller (not shown) for discharging the documents to the document discharge unit 26. The document conveying mechanism 27 further has a document reversing mechanism (not shown) for reversing the document and conveys the position facing the document reading slit 23 again, so that images on both sides of the document can be read by the scanner unit 21 via the document reading slit 23.

The document feeding unit 24 is provided to be rotatable with respect to the document reader 20 so that the front surface side of the document feeding unit 24 can be moved upward. By moving the front surface side of the document feeding unit 24 upward and opening an upper surface of the document board 22, an operator can place, on the document board 22, the document to be read, such as a spread book.

FIG. 2 is a block diagram showing an example of an electrical configuration of the multi functional peripheral 1. As shown in FIG. 2, the multi functional peripheral 1 has a network I/F (interface) unit 30, an image data storage unit 40, a user interface unit 50, a recording unit 60, cleaning unit 70, and the control unit 33.

The network I/F unit 30 is for controlling the transmission and reception of various data between the network I/F unit 30 and an information processing device (external device) such as a PC connected through a LAN or other network. The image data storage unit 40 is for temporarily storing the image data transmitted from the PC or the like via the network I/F unit 30.

The user interface unit 50 is provided in a front part of the multi functional peripheral 1 and functions as an input key used by a user to input various instructions or displays predetermined information.

The recording unit 60 has the image forming unit 2, a transfer unit 61, the fixing unit 16, and a sheet feeding unit 9. The recording unit 60 prints an image on the sheet of paper based on the image data stored in the image data storage unit 40. The transfer unit 61 has the intermediate belt 10, the driving roller 11, the driven roller 12, the tension roller 13, and the secondary transfer roller 14, and transfers the toner image on the photoreceptor drums 3 to the sheet of paper via the intermediate belt 10.

The cleaning unit 70 is configured by the neutralizing cleaner 18 (including the photoreceptor cleaning unit 7).

The control unit 33 is configured by a ROM (Read Only Memory) for storing various control programs, a RAM (Random Access Memory) functioning to temporarily storing data or functioning as a work area, and a microcomputer functioning to reading out the control programs from the ROM and executing the control programs. The control unit 33 is responsible for transmitting and receiving various control signals to and from each function unit to perform operation control on the entire multi functional peripheral 1.

The control unit 33 also has a dot pattern processing unit 34, a restriction detail table storage unit 35, and an image formation control unit 36.

The dot pattern processing unit 34 detects the presence/absence of an operation restricting dot pattern formed in the background region of an image and the color of the operation restricting dot pattern when the dot pattern processing unit 34 detects the presence/absence of an operation restricting dot pattern, and is provided with an R dot pattern detection unit 341, a G dot pattern detection unit 342, a B dot pattern detection unit 343, and a dot pattern color determination unit 344.

The operation restricting dot pattern is a pattern for prohibiting the action of copying (action of forming the image on the sheet of paper) under a predetermined condition, when the presence of the pattern is detected in the image data that is obtained by reading the image on the document containing the pattern. Note in the present embodiment that the operation restricting dot pattern is formed while being contained in a tint block described hereinafter.

Figure 3B:
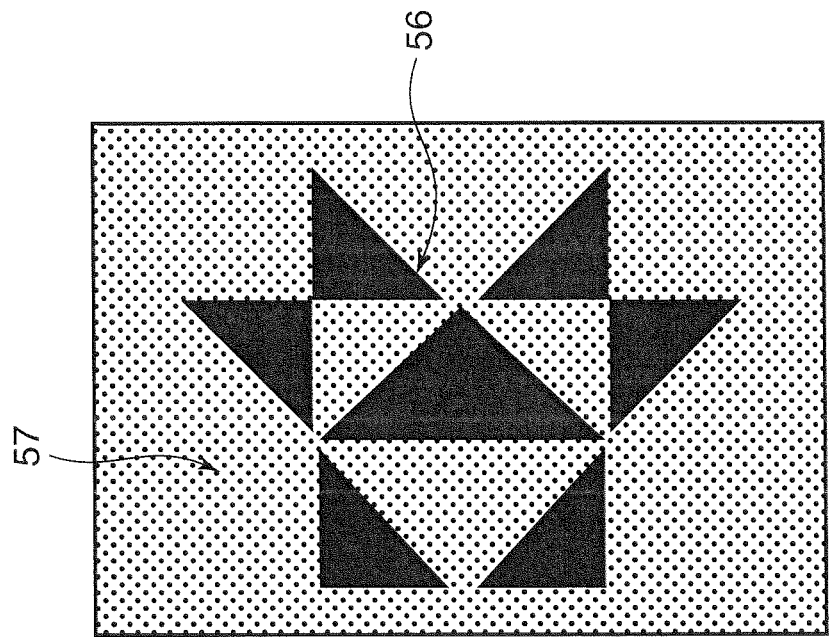
FIG. 3A, and FIG. 3B are diagram showing examples of tint blocks.
Figure 3A:
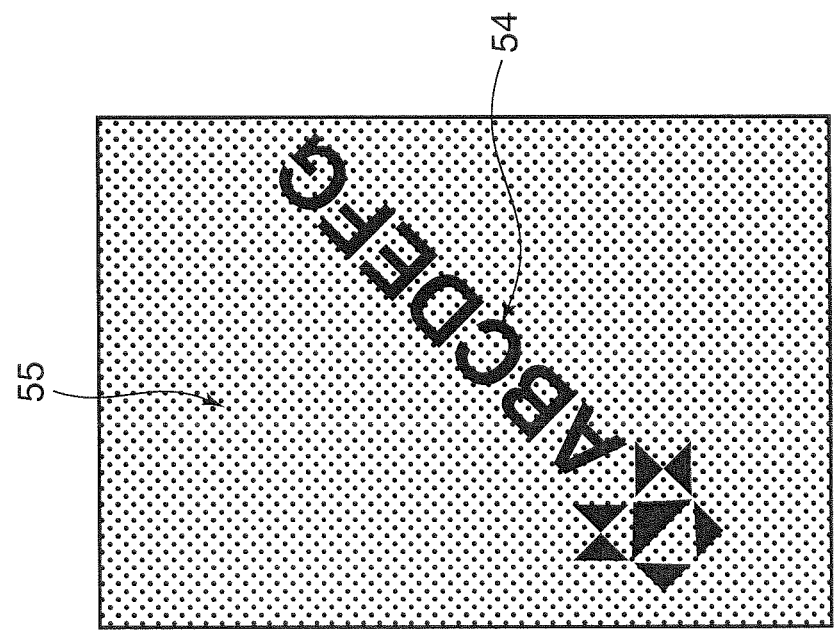

FIGS. 3A and 3B are diagrams showing examples of the ting block. The tint block has a latent image part 54, 56 and a background part 55, 57 formed by screen lines the number of which is different from each other, as shown in FIGS. 3A and 3B.

As shown in FIG. 4, the number of screen lines (halftone dot density) forming each of the latent image parts 54, 56 (see FIG. 4A) is greater than the number of screen lines forming each of the background parts 55, 57 (see FIG. 4B). Each of the background parts 55, 57 are created by dots of the size (diameter) that can be resolved by a reading operation performed by a general multi functional peripheral, including the multi functional peripheral 1, while each of the latent image parts 54, 56 is created by dots of the size (diameter) that cannot be resolved by the reading operation performed by the general multi functional peripheral, including the multi functional peripheral 1.

Therefore, when the reading operation is carried out on the document having the tint block formed thereon, on the copied material, the part corresponding to the area of each latent image part 54, 56 on the document normally becomes white and a predetermined pattern emerges visibly. The tint block is formed by halftone dots that have one or plurality of parameters, including the size of each halftone dot, the density of the halftone dots, the number of screen lines, and the halftone dot angle, which are different from those of a image of an image area. The operation restricting dot pattern is formed by halftone dots that have one or plurality of parameters, including the size of each halftone dot, the density of the halftone dots, the number of screen lines, and the halftone dot angle, which are different from those of a image of an image area or a tint block of a section other than the operation restricting dot pattern.

The R dot pattern detection unit 341 detects whether or not the image data of the operation restricting dot pattern is contained in document image data of the R (red) component out of document image data of the color components of R (red), G (green) and B (blue) that are output from the scanner unit 21 (whether or not the image data of the operation restricting dot pattern of the R (red) component exists).

In other words, the R dot pattern detection unit 341 stores, in advance, reference data about the image data of the R-color operation restricting dot pattern, and detects whether or not there exists the image data matching the reference data in the document image data of the R (red) component that is received from the scanner unit 21. The reference data is obtained by setting each of the parameters, such as the size of each halftone dot, the density of the halftone dots, the number of screen lines, and the halftone dot angle, to a predetermined value.

The G dot pattern detection unit 342 detects whether or not a predetermined operation restricting dot pattern data is contained in document image data of the G (green) component out of the document image data of the color components of R (red), G (green) and B (blue) that are output from the scanner unit 21 (whether or not the image data of the operation restricting dot pattern of the G (green) component exists).

In other words, the G dot pattern detection unit 342 stores, in advance, reference data about the image data of the operation restricting dot pattern of the G component, as in the detection method of the R dot pattern detection unit 341 described above, and then detects whether or not there exists the image data matching the reference data in the document image data of the G (green) component that is received from the scanner unit 21. The reference data is obtained by setting each of the parameters, such as the size of each halftone dot, the density of the halftone dots, the number of screen lines, and the halftone dot angle, to a predetermined value.

The B dot pattern detection unit 343 detects whether or not a predetermined operation restricting dot pattern data is contained in document image data of the B (blue) component out of the document image data of the color components of R (red), G (green) and B (blue) that are output from the scanner unit 21 (whether or not the image data of the operation restricting dot pattern of the B (blue) component exists).

In other words, the B dot pattern detection unit 343 stores, in advance, reference data about the image data of the operation restricting dot pattern of the B component, as in the detection methods of the R dot pattern detection unit 341 and the G dot pattern detection unit 342 described above, and then detects whether or not there exists the image data matching the reference data in the document image data of the B (blue) component that is received from the scanner unit 21. The reference data is obtained by setting each of the parameters, such as the size of each halftone dot, the density of the halftone dots, the number of screen lines, and the halftone dot angle, to a predetermined value.

Incidentally, as shown in FIG. 5, when the color of the operation restricting dot pattern formed on the document is K (black), for example, the pixel values of the image data of the R (red), G (green) and B (blue) operation restricting dot patterns are small. Furthermore, when the color of the operation restricting dot pattern formed on the document is R (red), for example, the pixel value of only the R (red) image data becomes relatively large and the pixel values of the G (green) and B (blue) image data become relatively small. In addition, when the color of the operation restricting dot pattern formed on the document is C (cyan), for example, the G (green) and B (blue) image data become relatively large and the R (red) image data becomes relatively small.

In this manner, a combination pattern of the large and small pixel values represented by the image data of the operation restricting dot patterns of the R (red), G (green) and B (blue) color components becomes inherent in the type of color of the operation restricting dot pattern formed on the document, and corresponds to the color of the operation restricting dot pattern formed on the document.

Therefore, in the present embodiment, the color of the document is white. In this case, for example, when the pixel value represented by the image data of the R-component operation restricting dot pattern is large and approximates the pixel value of the R (red) photoelectric conversion element obtained by reading the white background with no image, it is difficult to find whether the target image data is the image data of the operation restricting dot pattern or the image data representing the white background.

Specifically, the R dot pattern detection unit 341 cannot detect the image data of the operation restricting dot pattern from the R (red) document image data received from the scanner unit 21, when the pixel value represented by the image data of the R-component operation restricting dot pattern is large and approximates the pixel value of the image data of the R (red) photoelectric conversion element obtained by reading the white background with no image. The same is true in the G dot pattern detection unit 342 and the B dot pattern detection unit 343.

Therefore, in the present embodiment, the R dot pattern detection unit 341 uses the R (red) image data having a relatively small pixel value (with the R (red) image data having a relatively small pixel value as a target) excluding the image data approximating the pixel value of the image data representing the white background, to detect the image data of the R-component operation restricting dot pattern.

Specifically, the R dot pattern detection unit 341 detects whether or not the image data having a relatively small pixel value and matching the reference data is contained in the R (red)-component document image data received from the scanner unit 21.

When the R dot pattern detection unit 341 detects that the image data having a relatively small pixel value and matching the reference data is contained in the R (red)-component document image data received from the scanner unit 21, the R dot pattern detection unit 341 notifies the dot pattern color determination unit 344 of the detection result indicating that the image data of the R-component operation restricting dot pattern is detected. When, on the other hand, the R dot pattern detection unit 341 does not detect that the image data having a relatively small pixel value and matching the reference data is contained in the R (red)-component document image data received from the scanner unit 21, the R dot pattern detection unit 341 notifies the dot pattern color determination unit 344 of the detection result indicating that the image data of the R-component operation restricting dot pattern is not detected. The G dot pattern detection unit 342 and the B dot pattern detection unit 343 also carry out the same processing as the R dot pattern detection unit 341.

The dot pattern color determination unit 344 determines the presence/absence of the operation restricting dot pattern on the document and the color of the operation restricting dot pattern, based on the detection results of the R dot pattern detection unit 341, the G dot pattern detection unit 342 and the B dot pattern detection unit 343.

FIG. 6 is a diagram of a table showing the relationship between the detection result concerning the presence/absence of the operation restricting dot pattern of each color component obtained by R dot pattern detection unit 341, the G dot pattern detection unit 342 and the B dot pattern detection unit 343, and the color of the operation restricting dot pattern. Note that in FIG. 6 the circles represent that the image data of the operation restricting dot pattern of each color component is detected, while "x" marks represent that the image data of the operation restricting dot pattern of each color component is not detected.

Note that this table assumes that there is a total of seven colors, K (black), R (red), G (green), B (blue), C (cyan), M (magenta) and Y (yellow), which are used in the operation restricting dot patterns formed on the document.

The dot pattern color determination unit 344 stores the table shown in FIG. 6 in advance. Based on the detection results obtained from the R dot pattern detection unit 341, the G dot pattern detection unit 342, and the B dot pattern detection unit 343, the dot pattern color determination unit 344 detects the presence/absence of the operation restricting dot pattern and then detects the color thereof when the operation restricting dot pattern is detected, and outputs, to the image formation control unit 36, first detection result information representing the presence/absence of the operation restricting dot pattern on the document, and second detection result information representing the color of the dot pattern when the operation restricting dot pattern is detected.

For example, when the image data of the operation restricting dot patterns of the R (red), G (green) and B (blue) color components are detected by the R dot pattern detection unit 341, the G dot pattern detection unit 342 and the B dot pattern detection unit 343 respectively, the dot pattern color determination unit 344 determines that the operation restricting dot pattern is formed on the document, based on the table shown in FIG. 6, and outputs the information indicative thereof, as the first detection result information. The dot pattern color determination unit 344 determines that the color of the operation restricting dot pattern formed on the document is black, and outputs the information indicative thereof, as the second detection result information.

Furthermore, when only the image data of the R (red)- and G (green)-component operation restricting dot patterns out of the R (red), G (green) and B (blue) are detected by the R dot pattern detection unit 341, the G dot pattern detection unit 342 and the B dot pattern detection unit 343, the dot pattern color determination unit 344 determines that the operation restricting dot pattern is formed on the document, and outputs the information indicative thereof, as the first detection result information. The dot pattern color determination unit 344 determines that the color of the operation restricting dot pattern formed on the document is blue, and outputs the information indicative thereof, as the second detection result information.

When the image data of any of the R (red)-, G (green)- and B (blue)-component operation restricting dot patterns are not detected, the dot pattern color determination unit 344 determines that the operation restricting dot pattern is not formed on the document, and outputs the information indicative thereof, as the first detection result information and the second detection result information.

The restriction detail table storage unit 35 stores a restriction detail table that shows the correspondence relationship between the color of the operation restricting dot pattern and the restriction detail concerning the copy operation. An example of this table is shown in FIG. 7.

The restriction detail table shown in FIG. 7 establishes, for example, a restriction detail explaining that all outputs are inhibited when the color of the operation restricting dot pattern is K (black), a restriction detail explaining that color copying and black-and-white copying are prohibited when the color is R (red), a restriction detail explaining that color copying is prohibited when the color is G (green), a restriction detail explaining that copying and scanning (reading operation) are prohibited when the color is B (blue), a restriction detail explaining that output before the specified date is prohibited when the color is C (cyan), and a restriction detail explaining that output by a user other than the specific user is prohibited when the color is M (magenta).

The image formation control unit 36 controls an image formation operation performed by the image forming unit 2, based on the first and second detection result information received from the dot pattern color determination unit 344 and the restriction detail table stored in the restriction detail table storage unit 35.

For example, when the first detection result information received from the dot pattern processing unit 34 is the information indicating that the operation restricting dot pattern is not detected, the image formation control unit 36 instructs the image forming unit 2 to carry out the image formation operation.

When the first detection result information received from the dot pattern processing unit 34 is the information indicating that the operation restricting dot pattern is detected, and the second detection result information is the information indicating that the color of the operation restricting dot pattern is G (green), the image formation control unit 36 refers to the restriction detail table storage unit 35 and recognizes that the document is added with the operation restricting dot pattern of the color that represents the restriction detail prohibiting color copying.

The image formation control unit 36 then determines whether or not the setting status for the current operation of the multi functional peripheral 1 is relevant to the restriction detail corresponding to the G (green)-component operation restricting dot pattern, that is, whether or not the instruction to the document is about the execution of color copying. If so, the instruction to execute color copying is not output to the recording unit 60 (execution of color copying is prohibited). When another instruction such as an instruction to execute black-and-white copying is issued, the recording unit 60 is instructed (allowed) to carry out the image formation operation based on the instruction by the image formation control unit 36.

FIG. 8 is a flowchart showing a series of copy operations performed by the multi functional peripheral 1.

As shown in FIG. 8, when the instruction to execute a series of certain copy operations on the document is issued using the user interface unit 50 (YES in step #1), the document reader 20 executes the reading operation (step #2).

Next, the dot pattern processing unit 34 carries out a detection process for detecting the presence/absence of the operation restricting dot pattern and the color thereof, based on the image data obtained in the reading operation of the document reader 20 (step #3). Note that in this detection process, the dot pattern processing unit 34 determines the presence/absence of the image data of the operation restricting dot pattern of each color component, based on the image data of each of the R (red), G (green) and B (blue) components, and then the dot pattern processing unit 34 determines the color of the operation restricting dot pattern based on the combination of color components corresponding to the image data of the operation restricting dot pattern and the table shown in FIG. 6, as described above.

Then, when the operation restricting dot pattern is not detected by the dot pattern processing unit 34 (NO in step #4), the image formation control unit 36 causes the recording unit 60 to execute the image formation operation in accordance with the detail of the copy operation instructed in step #1 (step #8).

However, when the operation restricting dot pattern is detected by the dot pattern processing unit 34 (YES in step #4), the image formation control unit 36 refers to the table stored in the restriction detail table storage unit 35 and recognizes the restriction detail corresponding to the color of the operation restricting dot pattern (step #5), and determines whether or not the setting status for the current operation of the multi functional peripheral 1 is relevant to this restriction detail (step #6).

When the image formation control unit 36 determines that the setting status for the current operation of the multi functional peripheral 1 is relevant to the restriction detail (YES in step #6), the image formation control unit 36 does not output the instruction to execute the image formation operation to the image forming unit 2, and shows a notification indicating that the copy operation on the document is prohibited with this setting status for the current operation of the multi functional peripheral 1 (step #7). When the image formation control unit 36 determines that the setting status for the current operation of the multi functional peripheral 1 is not relevant to the restriction detail (NO in step #6), the image formation control unit 36 causes the recording unit 60 to execute the image formation operation in accordance with the detail of the copy operation instructed in step #1 (step #8).

As described above, in the multi functional peripheral 1 of the present embodiment, the correspondence relationship between the colors of the operation restricting dot pattern and the restriction details associated with the copy operation is stored in advance, and the function for detecting the color of the operation restricting dot pattern when the operation restricting dot pattern is added to the document is installed. Further, when the color of the operation restricting dot pattern is detected, it is determined whether or not the setting status for the current operation of the multi functional peripheral 1 (the instruction detail concerning the document copy operation) is relevant to the restriction detail corresponding to the color, and if it is relevant, then the copy operation is prohibited. Therefore, restriction modes of various copy operation on the basis of the restriction detail can be established for the number of colors of the operation restricting dot patterns that can be detected by the multi functional peripheral 1, and consequently, compared to the conventional technology, more advanced copy control can be performed.

Because various copying control that has different limit content is performed depending on the color of the operation restricting dot pattern, the operation restricting dot pattern does not have to be set in accordance with the restriction detail, as in the conventional technology. Hence, the copy control can be executed depending on the restriction detail by using one operation restricting dot pattern.

Thus, unlike the conventional structure that needs to store a plurality of operation restricting dot patterns, a memory with a storage capacity smaller than that of the conventional one is sufficient as the memory for storing the operation restricting dot pattern, and the process for discriminating the plurality of operation restricting dot patterns that is required in the conventional technology is no longer necessary. Consequently, the processing circuit and the processing time for such discriminating process can be prevented from increasing, and the control of the copy operations according to the restriction details can be realized with a simple structure or process.

In the present invention, instead of or in addition to the present embodiment, the following modified embodiment can be adopted as well.

In the embodiment described above, the restriction detail table that shows the correspondence relationship between the color of the operation restricting dot pattern and the restriction detail concerning a copy operation is stored in the restriction detail table storage unit 35 in advance, and the control of the copy operation is carried out based on the restriction detail table and the color of the operation restricting dot pattern which is detected. However, the embodiment is not limited to this embodiment, and therefore the user can be allowed to set the restriction details to be associated with the color of the operation restricting dot pattern, as described hereinafter.

Figure 9:
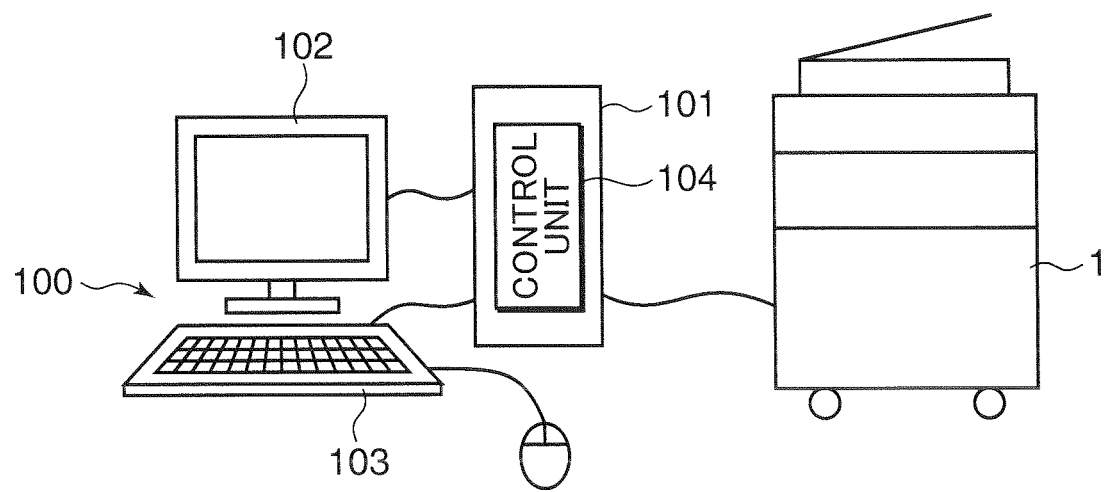
FIG. 9 is a diagram showing a configuration of a modified embodiment [1] that has a function for allowing a user to set the restriction detail associated with the color of the operation restricting dot pattern.

FIG. 9 is a diagram showing an embodiment in which a device different than the multi functional peripheral 1 is installed with an input operation unit that is used by the user to input the settings of the restriction details associated with the color of the operation restricting dot pattern. In the present embodiment, a personal computer (to be referred to as "PC" hereinafter) 100 is adopted as an example of the device mentioned above.

As shown in FIG. 9, the multi functional peripheral 1 is connected in a communicatable manner to the PC 100. The PC 100 is configured by a device main body 101 that has a control unit 104 configured by the ROM (Read Only Memory), RAM (Random Access Memory) and a microcomputer, they are not shown in the figure, a display 102 for displaying a predetermined screen in response to an instruction from the control unit 104, and an input operation unit 103, having a mouse or a keyboard, for inputting various instructions or information to the control unit 104.

This PC 100 stores in the control unit 104 a program (driver) for displaying, on the display 102, a restriction detail setting screen to allow the user to input the settings of the color of the operation restricting dot pattern and the restriction details, and for storing, in the control unit 33 of the multi functional peripheral 1, an input value of an input item displayed on the screen.

Figure 10:
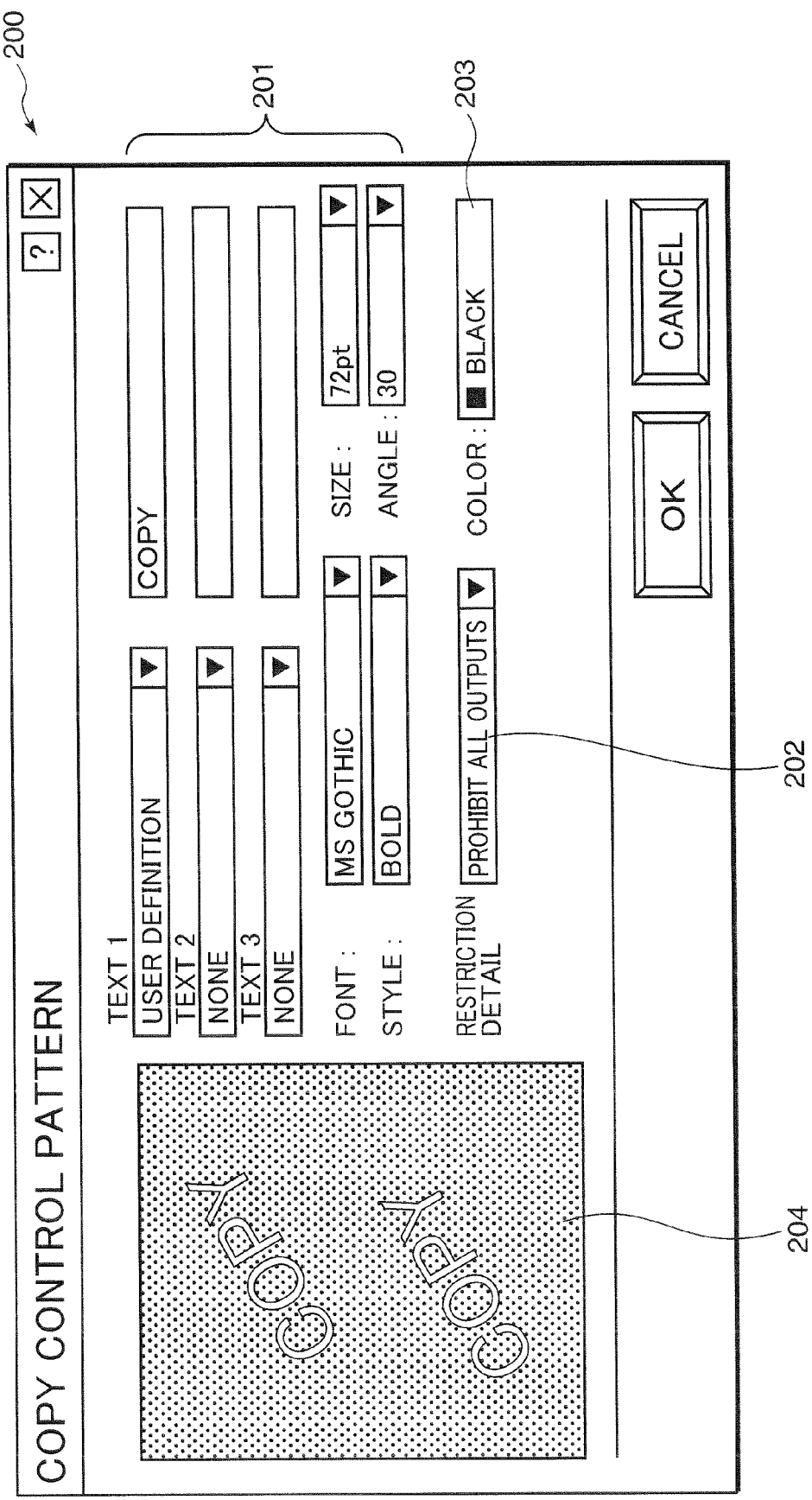
FIG. 10 is a diagram showing an example of a restriction detail setting screen for allowing the user to set the restriction detail associated with the color of the operation restricting dot pattern.

FIG. 10 shows an example of the restriction detail setting screen that is displayed on the display 102 of the PC 100 by the program. Here, it is assumed that the multi functional peripheral 1 has a function for forming a tint block with the operation restricting dot pattern when forming an image on a sheet of paper, and that the setting for the tint block can be performed on the restriction detail setting screen.

A restriction detail setting screen 200 shown in FIG. 10 has a box group 201 for setting a character employed as the tint block and the size, font, angle and style of the character, a box 202 for selecting the restriction detail to be set for an output product (copied material), a window 203 for displaying the color of a target corresponding to the restriction detail selected by the box 202 (the color of the operation restricting dot pattern), and an imaginary image display unit 204 that displays an imaginary image when outputting the tint block having the operation restricting dot pattern onto the sheet of paper, in accordance with the details set by the box group 201, the box 202 and the window 203.

Out of the input values that are input using the restriction detail setting screen 200, the input values that are input by the box 202 and the window 203 are transmitted as input value information to the multi functional peripheral 1. When the control unit 33 of the multi functional peripheral 1 receives the input value information, the input values are stored in the table of the restriction detail table storage unit 35. Thereafter, the image formation control unit 36 refers to the table and executes the processes of the steps #5, #6 and #7 shown in the flowchart of FIG. 8.

By allowing the user to set the restriction details to be associated with the color of the operation restricting dot pattern as described above, any restricting aspect related to the copy operation can be set.

The above has described the embodiment where the restriction details to be associated with the operation restricting dot pattern is set by the PC 100, but the function for setting the restriction detail may be installed in the multi functional peripheral 1 itself. Moreover, in the above embodiment where the user uses the PC 100 to input the settings of the restriction details associated with the color of the operation restricting dot pattern, the PC 100 and the multi functional peripheral 1 may be included in the image forming apparatus of the present invention.

Although the above has described the embodiment in which the restriction details to be associated with the color of the operation restricting dot pattern is set, the color of the operation restricting dot pattern to be associated each restriction detail may be set.

In the first embodiment, the dot pattern processing unit 34 has the R dot pattern detection unit 341, the G dot pattern detection unit 342, and the B dot pattern detection unit 343, wherein each of the detection units 341 to 343 performs the detection process for detecting the operation restricting dot pattern and the color detection process for detecting the color of the operation restricting dot pattern, simultaneously and, concurrently but the embodiment may not be limited thereto, and therefore the following configuration can be employed as well.

In other words, instead of providing the dot pattern processing units 34 with the R dot pattern detection unit 341, the G dot pattern detection unit 342 and the B dot pattern detection unit 343, only one detection unit having substantially the same functions as the detection units 341 to 343 may be provided, and this detection unit may retrieve the image data of the R (red), G (green) and B (blue) components from the scanner unit 21 in sequential order, and execute the detection process and the color detection process of the image data of the operation restricting dot pattern corresponding to the image data of each color component and, in order of the colors of the retrieved image data.

In this case, because the dot pattern processing unit 34 has only one detection unit, the size of the circuit can be made smaller than that of the first embodiment.

The present invention can be applied to not only a multi functional peripheral but also a copier and an image reader, such as a scanner that has a reading function only, and it is assumed that a reading operation on the entire document by this image reader is prohibited.

In this case, the image reader executes a reading operation on the document up to an intermediate point of reading, in order to obtain the image data to perform a process of detecting the presence/absence of a operation restricting dot pattern or the color of the operation restricting dot pattern on the document.

The image reader has, although not shown, R, G and B pattern detection units for detecting whether or not the operation restricting dot pattern is contained in the image data of each color component obtained in the reading operation, a dot pattern color determination unit for detecting the presence/absence of the operation restricting dot pattern on the document and the color of the operation restricting dot pattern, a restriction detail table storage unit for storing, in advance, the correspondence relationship between the color of the operation restricting dot pattern and the restriction details concerning the reading operation, and a reading control unit that determines, based on determination information of the dot pattern color determination unit and the restriction detail table stored in the restriction detail table storage unit, whether or not a setting status for the current operation of the image reader (the instruction detail concerning the document reading operation) is relevant to the restriction detail corresponding to the color, wherein when the setting status is relevant to the restriction detail, the reading operation performed by an unshown reading unit is restricted, and when the setting status is not relevant to the restriction detail, the reading operation that was performed up to an intermediate point of reading is restarted by the reading unit.

Therefore, restriction modes of various reading operation on the basis of the restriction detail can be established for the number of colors of operation restricting dot patterns that can be detected by the image reader, and consequently, compared to the conventional technology, more advanced reading control can be performed. Moreover, because the reading control is performed based on different restriction details utilizing the operation restricting dot pattern colors, the control of the reading operations according to the different restriction details can be realized with a simple structure or process.

Note that this technical idea may be applied to the reading operation of the multi functional peripheral 1 according to the first embodiment.

According to the present invention, the color of the operation restricting dot pattern and the restriction details for the operations of the image forming apparatus are associated in advance and stored in the storage unit. When the operation restricting dot pattern and the color thereof are detected, the control unit reads, from the storage unit, the restriction detail that associates the color of the operation restricting dot pattern with the setting status for the current operation of the image forming apparatus or image reader, and restricts the operation of the image forming apparatus or image reader in accordance with the read restriction detail. Thus, operation control on the basis of various restriction detail can be performed for the number of colors of the operation restricting dot patterns that can be detected by the image forming apparatus.

In addition, because the operation control can be performed based on the different restriction details utilizing the operation restricting dot pattern colors, unlike the conventional technology, the operation restricting dot pattern does not have to be set in accordance with the restriction detail, and the operation control can be carried out based on the different restriction details by using one operation restricting dot pattern.

Specifically, in the conventional technology, when using a plurality of pattern images to display various information including the duplication prohibition information or condition information, the information on the pattern images need to be kept beforehand in accordance with the number of pattern images to be detected, and a memory with a relatively large storage capacity is required for keeping the information. Moreover, in order to prevent the information of the pattern images formed on the document from being confused with other pattern images and erroneously read, a complicated process is necessary to analyze the shape of the pattern image in detail, which causes the increase of the processing circuit and processing time. However, according to the present invention, the memory for storing the operation restricting dot pattern only requires a storage capacity smaller than that of the conventional technology in which a plurality of operation restricting dot patterns have to be stored, and a process for discriminating the plurality of operation restricting dot patterns that is required in the conventional technology is no longer necessary. Consequently, the processing circuit and the processing time for such discriminating process can be prevented from increasing, and the control of the operations according to the different restriction details can be realized with a simple structure or process.

Moreover, according to the present invention, the color of the operation restricting dot pattern and the restriction details concerning the reading operation of the image reader are associated in advance. When the operation restricting dot pattern and the color thereof are detected, and when the current setting status of the image reader is relevant to the restriction detail corresponding to the color of the operation restricting dot pattern, the reading operation of the image reader is prohibited. When the setting status is not relevant to the restriction detail, the image reader is allowed to carry out the reading operation. Thus, the reading control of various restriction details can be performed for the number of colors of the operation restricting dot patterns that can be detected by the image reader.

This application is based on Japanese Patent Application Serial No. 2009-017941, filed in Japan Patent Office on Jan. 29, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus, comprising:
an image reading unit that reads an image of a document as image data of a plurality of color components used in a predetermined color system;
a recording unit that forms an image on a recording medium based on image data obtained by a reading operation of the image reading unit;
a detection unit that detects a predetermined operation restricting dot pattern formed on the document based on the image data obtained by the reading operation of the image reading unit, and detects a color of the operation restricting dot pattern when the operation restricting dot pattern is detected, the detection unit includes:
a plurality of dot pattern detection units that are allocated respectively to image data of each of the plurality of color components, and, based on image data of the respective allocated color components, detect the operation restricting dot pattern of the allocated color component; and
a dot pattern color determination unit that determines that the operation restricting dot pattern is formed on the document when any one of the plurality of dot pattern detection units detects the operation restricting dot pattern of the respective allocated color component, and determines that the color of the operation restricting dot pattern is formed on the document from a combination of presence or absence of detecting the color component of the operation restricting dot pattern by the plurality of dot pattern detection units;
a storage unit that stores, beforehand, a correspondence relationship between the color of the operation restricting dot pattern and a restriction detail for an operation of the image forming apparatus, the correspondence relationship defines a relationship that allocates different restriction details to the operation restricting dot pattern according to the colors of the operation restricting dot pattern; and
a control unit that reads, from the storage unit, the restriction detail corresponding to the color of the operation restricting dot pattern when the operation restricting dot pattern is formed and the color of the restricting dot pattern is determined by the detection unit, and then restricts the operation of the image forming apparatus in accordance with the restriction detail.

2. The image forming apparatus according to claim 1, further comprising an input operation unit that executes inputting of an instruction to associate the restriction detail related to the operation of the image forming apparatus with the color of the operation restricting dot pattern and store thus obtained data in the storage unit, wherein
the storage unit stores the correspondence relationship between the restriction detail and the color of the operation restricting dot pattern that are related to the instruction, when the instruction is input by the input operation unit.

3. The image forming apparatus according to claim 1, wherein
the storage unit stores, beforehand, a correspondence relationship between the color of the operation restricting dot pattern and the restriction detail related to the reading operation performed by the image reading unit and an image formation operation performed by the recording unit, and
the control unit reads the restriction detail corresponding to the color of the operation restricting dot pattern from the storage unit when the operation restricting dot pattern and the color thereof are detected by the detection unit, prohibits, from among the reading operation of the image reading unit and the image formation operation of the recording unit, at least the image formation operation in accordance with the restriction detail when a setting status for a current operation of the image forming apparatus is relevant to the restriction detail, and allows the image reading unit and the recording unit to perform the reading operation and the image formation operation respectively when the setting status for the current operation of the image forming apparatus is not relevant to the restriction detail.

4. An image reader, comprising:
an image reading unit that reads an image of a document as image data of a plurality of color components used in a predetermined color system;
a detection unit that detects a predetermined operation restricting dot pattern formed on the document based on image data obtained by a reading operation performed up to an intermediate point of reading by the image reading unit, and detects a color of the operation restricting dot pattern when the operation restricting dot pattern is detected, the detection unit including a plurality of dot pattern detection units that are allocated respectively to each image data of the plurality of color components, and, based on image data of allocated color components, detects the operation restricting dot pattern of the allocated color component; and
a dot pattern color determination unit that determines that the operation restricting dot pattern is formed on the document when any one of the plurality of dot pattern detection units detects the operation restricting dot pattern of the respective allocated color component, and determines that the color of the operation restricting dot pattern is formed on the document from a combination of presence or absence of detecting the color component of the operation restricting dot pattern by the plurality of dot pattern detection units;

a storage unit that stores, beforehand, a correspondence relationship between the color of the operation restricting dot pattern and a restriction detail for an operation of the image forming apparatus, the correspondence relationship defines a relationship that allocates different restriction details to the operation restricting dot pattern according to the colors of the operation restricting dot pattern; and a control unit that reads, from the storage unit, the restriction detail corresponding to the color of the operation restricting dot pattern when the operation restricting dot pattern is formed and the color of the restricting dot pattern is determined by the detection unit, and then restricts the operation of the image forming apparatus in accordance with the restriction detail.

5. The image reader according to claim 4, further comprising an input operation unit that executes inputting of an instruction to associate the restriction detail related to the reading operation of the image reading unit with the color of the operation restricting dot pattern and store thus obtained data in the storage unit, wherein the storage unit stores the correspondence relationship between the restriction detail and the color of the operation restricting dot pattern that are related to the instruction, when the instruction is input by the input operation unit.

6. The image reader according to claim 4, wherein the storage unit stores, beforehand, a correspondence relationship between the color of the operation restricting dot pattern and the restriction detail related to the reading operation performed by the image reading unit, and the control unit reads the restriction detail corresponding to the color of the operation restricting dot pattern from the storage unit when the operation restricting dot pattern and the color thereof are detected by the detection unit, prohibits the reading operation performed on the entire document by the image reading unit when a current setting status of the image reader is relevant to the restriction detail, and allows the image reading unit to perform the reading operation on the entire document when the current setting status of the image reader is not relevant to the restriction detail.

* * * * *